Oct. 17, 1939.　　　　C. HOWELL　　　　2,176,422
ROPE STRUCTURE
Filed May 11, 1939
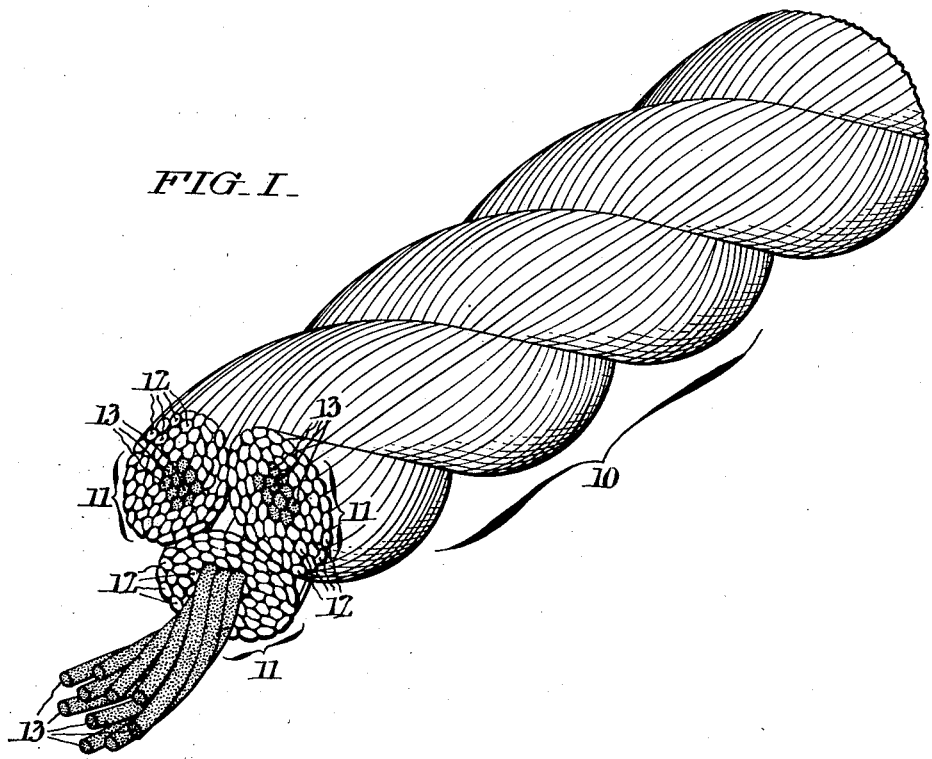
FIG. I.
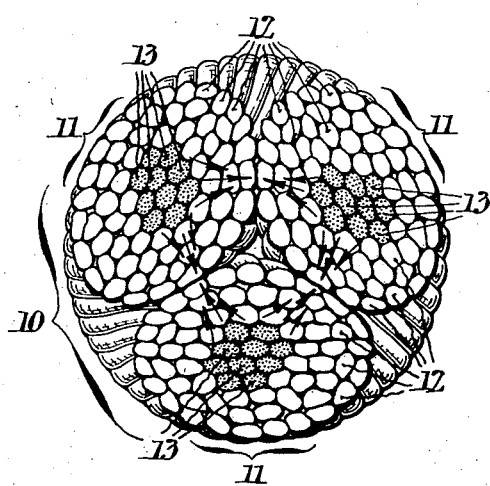
FIG. II.
WITNESSES:
Thomas W. Kerr, Jr.
Woodrow Stevenson
INVENTOR:
Cooper Howell,
BY Paul & Paul
ATTORNEYS.

Patented Oct. 17, 1939

2,176,422

UNITED STATES PATENT OFFICE 2,176,422

ROPE STRUCTURE

Cooper Howell, Blue Bell, Pa., assignor to The Edwin H. Fitler Company, Philadelphia, Pa., a corporation of Pennsylvania Application May 11, 1939, Serial No. 273,052

9 Claims. (Cl. 57—149)

This invention relates generally to rope structures and more particularly to the lubrication and water resistance of rope structures.

It is now no longer new to impregnate a rope structure with a lubricating or a water-repellent material or both. The use of a lubricating yarn to distribute a lubricant to surrounding slivers (in contradistinction to yarns) is a feature of the particular rope structure disclosed by Metcalf in his United States Patent No. 1,479,865, issued January 8, 1924. In wire ropes it is perhaps established practice to provide a central lubricating core surrounded by the wire strands, but the prior art has not yet suggested an efficient and controlled method of rope lubrication. The use of a lubricating yarn is old and it operates, as disclosed in the prior art, to give a general distribution of lubricants or water-repellent materials to all points in the rope. The problem is one of efficient distribution which Metcalf tries to solve by "locating the lubricating impregnated yarn in a surrounding body of soft fibers", which are operatively different from twisted yarns.

In order to obtain a high degree of flexibility, there must be a free and liberal distribution of lubricant at the frictional points in the rope structure. When the lubricant is distributed generally and uniformly to all points in a sufficient quantity to lubricate the frictional points, the rope structure will become loaded and heavy with lubricant. This is undesirable because of the difficulties of handling due to both the weight and the greasy exterior of a lubricant loaded rope. A greasy outer surface causes slippage on a winch which generates heat and draws more lubricant from the interior of the rope to the surface. The matter of economy is also a factor.

The distribution of water-repellent materials according to a scientifically controlled system is also a desirable improvement in the art and allied to the problem of lubricant distribution. There are certain important points of wear which suffer more than others from the effects of water absorption. The life of a rope will be lengthened by an efficient distribution of a water-repellent material at these points of wear.

This invention is directed to the problem of controlled distribution of lubricant or water-repellent material, or both, at the critical points of frictional wear and deterioration. Another object of this invention is the provision of a controlled means of lubricant and water-repellent distribution which will not require substantial changes in established forms of rope structure. Another object of this invention is the provision of such a distribution means which will not unduly increase the present cost of manufacturing rope or unduly change present manufacturing processes. Still further objects and advantages will become apparent from the following detailed description of a preferred embodiment of this invention, reference being had to the accompanying drawing.

Fig. I is a perspective view of a three stranded rope, with a number of the central yarns of one of the strands extended beyond its severed end.

Fig. II is a transverse sectional view of the same.

In describing the preferred embodiment of the invention illustrated in the drawing, specific terminology will be resorted to for the sake of clarity. However, it is not the intention to be limited to the specific terms so selected, and it is to be understood that each specific term includes all technical equivalents which operate in a similar manner to accomplish a similar purpose.

In Fig. I, there is illustrated a conventional rope 10 composed of three strands 11 which are made up of outer yarns 12 and inner or lubricating yarns 13. In order to show the lubricating yarns 13 in their relation to the outer yarns 12, the lubricating yarns 13 of one strand are exposed by a cutback of the outer yarns 12 of that strand. It will be noticed that the lubricating yarns 13 have been twisted together with the outer yarns 12 in forming a conventional rope strand 11 in which all yarns are uniformly twisted together in the strand-forming machine. The only difference between yarns 12 and yarns 13 is in the impregnation carried by each.

In the production of the outer yarns 12 from the raw materials, a cordage oil, such as a paraffine base petroleum oil, is applied according to established practice in the art of rope making. This impregnation must be limited in order to avoid loading the yarns 12 with lubrication which will cause the finished rope 10 to exude oil on its surface and also increase the weight of the rope 10. The lubricating or inner yarns 13 are differently treated according to the practice of this invention. The lubricating yarns 13 may or may not be impregnated with the above mentioned cordage oil before being given special and further impregnation.

The lubricating yarns 13 are given a special impregnation of a lubricating and water-repellent material which has a substantially higher melting point than that of the cordage oil with which the yarns 12 are impregnated. Any of the well-known cordage oils and water-repellent materials may be selected in the practice of this invention, but the above mentioned relation of melting points is essential. Certain of the well-known copper compounds have been found to give satisfactory results as preservatives and water-repellents. Because of the high viscosity of this impregnation which has a relatively higher melting point, a very high degree of saturation of the yarns 13 is possible and desirable to provide a permanent and stable reservoir. By heating the impregnation for application to the yarns 13, it is possible to insure a full saturation. The choice of cordage oil and water-repellent material is well within the compass of the skilled artisan. Excellent results have been obtained from using a combination of cordage oil and water-repellent material which at normal temperatures solidifies into a soft wax-like form. The yarns so saturated with this impregnation of a relatively higher melting point and at a high temperature are allowed to cool before taking them to the strand-forming machine. The application of pressure rollers will aid in pressing said heated impregnation into a greater saturation of the yarn.

After the yarns 12 and 13 have been previously impregnated with these materials of substantially different melting points, the strand-forming machine twists them into a strand 11 with the lubricating yarns 13 centrally positioned and surrounded by a numerically greater number of outer yarns 12. In the preferred embodiment of this invention, shown in the drawing, the ratio of lubricating yarns 13 to outer yarns 12 is about ten to sixty-two.

In the practice of this invention, satisfactory results have been obtained from five lubricating yarns per strand for a four inch rope, from seven lubricating yarns per strand for a five inch rope, and from ten lubricating yarns per strand for a six inch rope. For the sake of clarity, the irrelevant details of rope manufacture have been omitted as properly committed to the experience of the skilled rope-maker.

In the operation of this invention, the heavily saturated lubricating yarns 13 function as a stable central reservoir which intermittently feeds to the points of frictional contact between strands 11 as internal heating develops. The inner yarns 13 being shorter than the outer yarns 12 are subjected to more wear and develop more heat from friction when the rope 10 is in use. The impregnation carried by the inner yarns 13, being of a substantially higher melting point than the impregnation of the outer yarns 12, is retained at the center of the strands 11 even under extended use. As the rope 10 is used, the impregnation of inner yarns 13 is rendered sufficiently more fluid to lubricate these yarns 13 without flowing generally to the outer strands 12. There will be a slight feeding, as frictional heat develops, from this internal reservoir to the outer yarns 12 to replenish the lubrication of the outer yarns 12. There will also be a greater feeding from this internal reservoir to the points of frictional wear between strands 11 due to the relatively greater amounts of heat developed about such focal points. The arrows in Fig. II diagrammatically show the heat-induced flow tendencies from the inner reservoir to the focal points of frictional wear between strands 11.

Thus the lubricant which is retained in the inner strands 13 because of the relatively higher melting point, is efficiently distributed as needed to the frictional areas. There is no uniform flooding of the outer strands 12 with lubricant which results in a greasy outer surface. The rope is efficiently lubricated at critical points without loading it uniformly throughout to a high degree of saturation. When the rope is stored, the central reservoir will remain intact for long periods because of its solidified state; and under the heat of operation this dormant lubricant will become active. The rope 10 is protected at the most vulnerable points from deterioration by the water-repellent material which is combined with the lubricant in the inner strands 13. The central portions of each strand 11 which are vulnerable to deterioration have the protection of the permanent reservoir of preservative and lubricant.

While the preferred embodiment of this invention has been described in some detail, it will be obvious to one skilled in the art that various modifications may be made without departing from the invention as hereinafter claimed.

Having thus described my invention, I claim:

1. A strand structure comprising a plurality of yarns impregnated with a lubricant and a lubricating yarn surrounded by said first mentioned yarns and impregnated with a lubricant of a higher melting point than said first mentioned lubricant.

2. A rope strand comprising a plurality of yarns carrying an impregnation and a yarn surrounded by said first mentioned yarns and carrying an impregnation of a higher melting point than said first mentioned impregnation.

3. A strand structure comprising a plurality of yarns impregnated with a lubricant and a yarn surrounded by said first mentioned yarns and impregnated with a water repellent material of a higher melting point than said lubricant.

4. A strand structure comprising a plurality of yarns impregnated with a lubricant and a yarn surrounded by said first mentioned yarns and impregnated with a lubricant and water repellent material of a higher melting point than the said first mentioned lubricant.

5. In a multiple strand rope structure a strand comprising a plurality of yarns carrying an impregnation, and a yarn surrounded by said first mentioned yarns and carrying an impregnation of a higher melting point than said first mentioned impregnation.

6. A multiple strand rope structure in which each strand comprises yarns impregnated with a lubricant and a yarn surrounded by said first mentioned yarns and impregnated with a lubricant and water repellent material of a higher melting point than the first mentioned lubricant.

7. The invention of claim 6 wherein said second mentioned yarn is centrally positioned with relation to the surrounding yarns of the strand.

8. The invention of claim 2 wherein the second mentioned yarn is centrally positioned with relation to the surrounding yarns.

9. The method of manufacturing rope which includes the steps of impregnating certain yarns of a strand with a lubricant, and separately impregnating a central yarn of said strand with a heated lubricant of higher melting point than said first mentioned lubricant, permitting said yarn impregnated with said heated lubricant to cool, and thereafter forming said yarns into a strand.

COOPER HOWELL.